United States Patent [19]
Vater et al.

[11] Patent Number: 4,498,356
[45] Date of Patent: Feb. 12, 1985

[54] MOTOR VEHICLE TRANSMISSION

[75] Inventors: George R. Vater, Clarendon Hills; Harold W. Melles, Downers Grove, both of Ill.

[73] Assignee: International Harvester Company, Chicago, Ill.

[21] Appl. No.: 379,549

[22] Filed: May 18, 1982

[51] Int. Cl.³ .......................... F16H 3/02; F16H 3/08; F16H 3/38
[52] U.S. Cl. ........................................ 74/745; 74/339; 74/331; 74/335; 74/360; 74/15.63
[58] Field of Search ................. 74/745, 339, 340, 331, 74/335, 356, 357, 358, 359, 360, 15.63, 15.6

[56] References Cited

U.S. PATENT DOCUMENTS

| | | | |
|---|---|---|---|
| 2,355,624 | 8/1944 | Bullard et al. | 74/745 X |
| 2,710,546 | 6/1955 | Du Shane et al. | 74/360 |
| 2,932,202 | 4/1960 | Rinkema | 74/15.63 X |
| 3,682,019 | 8/1972 | Hoyer et al. | 74/745 |
| 3,736,813 | 6/1973 | Kress et al. | 74/740 |
| 3,944,035 | 3/1976 | McRay | 74/745 X |
| 4,031,762 | 6/1977 | Shellberg | 74/331 X |
| 4,116,090 | 9/1978 | Zenker | 74/745 |

FOREIGN PATENT DOCUMENTS

| | | | |
|---|---|---|---|
| 1530901 | 8/1969 | Fed. Rep. of Germany | 74/360 |
| 2033032A | 5/1980 | United Kingdom | |
| 155734 | 1/1964 | U.S.S.R. | 74/331 |

Primary Examiner—Allan D. Herrmann
Assistant Examiner—Arthur T. Quiray
Attorney, Agent, or Firm—Boris Parad; F. David AuBuchon

[57] ABSTRACT

A motor vehicle transmission comprising a speed and range sections connected via a master clutch, provides all speed selections on-the-go, i.e. without stopping the motor vehicle. An engine driven input shaft extending through the speed transmission section carries a pair of drive clutch packs for power shifting of the speeds. The power shifting between the clutch packs on this shift requires no master clutch engagement or disengagement. The plurality of speed which are not power shifted engage via gear synchronizers which require the disengagement of the master clutch while vehicle is still on-the-go. The disengagement of the master clutch simultaneously disengages the clutches in the drive clutch pack and is sequenced in such a manner that re-engagement of the master clutch follows the re-engagement of the drive clutch packs.

11 Claims, 1 Drawing Figure

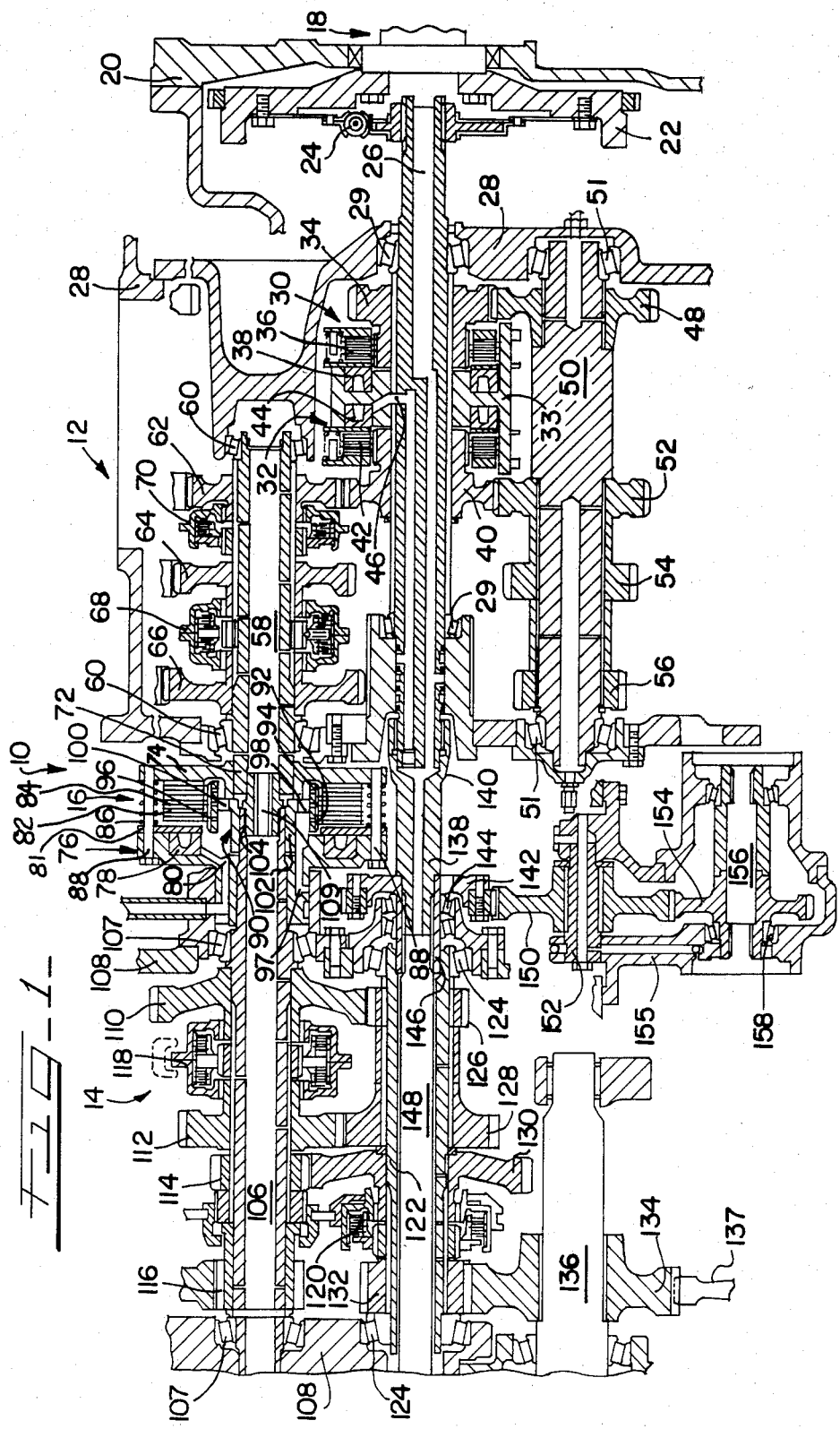

MOTOR VEHICLE TRANSMISSION

BACKGROUND OF THE INVENTION

1. FIELD OF THE INVENTION

This invention pertains to motor vehicle transmissions and, more particularly, to a tractor transmission having speed and range portion connected via a clutch.

2. DESCRIPTION OF THE PRIOR ART

The prior art is replete with various transmissions for industrial motor vehicles and agricultural tractors. For instance, the U.S. Pat. No. 3,736,813, issued to Kress et al., discloses a hydromechanical transmission having four ranges with infinitely variable speed characteristics, a drive clutch within planetary-type differential gearing, and the differential gearing being coupled with the range transmission.

The British patent No. GB2033032A discloses a fully synchronized change-speed gear for a vehicle having two switchable gearing groups being disposed respectively in front of and behind a starting clutch.

However, none of the prior art references of record illustrates, teaches or suggests a novel design of the transmission as disclosed in the subject invention.

SUMMARY OF THE INVENTION

According to the invention, a motor vehicle transmission comprises a speed transmission section connected with a vehicle engine. The speed transmission section comprises: an engine driven input shaft which extends through this section; drive clutch packs mounted on the input shaft and hydraulically actuated in the alternative manner; a plurality of gears mounted on the speed output shaft and selectively engageable by gear synchronizers secured to the output shaft; these gears are driven by drive gears mounted on an intermediate counter shaft which is driven by either of these clutch packs.

A range transmission section is in a tandem arrangement with the speed transmission section and coupleable therewith through a hydraulically actuated master clutch. This clutch transmits power from the speed transmission section to the range section. The range transmission section comprises: a plurality of synchronized forward gears and a non-synchronized reverse gear providing at least three speed range, whereby during all synchronized shifting the master clutch and the clutch packs are disengaged, and re-engagement of the master follows that of the clutch packs.

DESCRIPTION OF THE DRAWINGS

FIG. 1 is a fragmentary axial cross-sectional view of the motor vehicle transmission.

DESCRIPTION OF THE PREFERRED EMBODIMENT

The invention may be carried into practice in a number of ways but one specific embodiment will be described here by way of example only.

Referring now to drawings wherein reference characters designate like or corresponding parts throughout several views, there is shown in FIG. 1 a motor vehicle transmission 10. This transmission can be utilized in agricultural or in industrial tractors and the like vehicles. The transmission features fully synchronized, constant mesh gear arrangement and is constructed essentially in two sections. The transmission section 12 and the range transmission section 14 are disposed in a tandem arrangement with a master clutch 16 located therebetween. The speed section 12 follows an engine department 18, the housing thereof 20 being shown partially in the drawing. An engine flywheel 22 transfers torque from the engine through a dampener 24 to a input shaft 26. The transmission input shaft 26 extends through the speed section 12 and is rotatably supported by a pair of bearings 29 in the housing 28, only selected portions of which are shown in the drawing.

A lo-drive hydraulic clutch pack 30 is rotatably mounted on the input shaft 26 in juxtaposition with a hi-drive hydraulic clutch pack 32 sharing therewith a common clutch pack housing 33. The lo-drive clutch pack 30 comprises a lo-drive gear 34 and a clutch 36 frictionally engageable by a hydraulic piston 38. The hi-drive clutch pack 32 in its turn, comprises a hi-drive gear 40, a clutch 42 and a hydraulic piston 44. The hydraulic fluid input into the drive clutch packs is carried out through a hydraulic oil channel 46 communicating with a vehicle hydraulic system. The power shift operation of the pack clutches in the alternative manner is more detaily described in a co-assigned companion application Ser. No. 381,261 by Brown et al, titled "CHIP SYSTEM TO MONITOR AND DIGITALLY CONTROL A MULTIPLE CLUTCH TRANSMISSION".

A lo-driven gear 48 is rotatably mounted on a speed counter shaft 50 which is journalled in the housing 28 by a pair of bearings 51. The lo-driven gear 48 is constantly meshing with the lo-drive gear 34 transmitting power from the input shaft 26 when the drive clutch pack 30 is actuated. A hi-driven gear 52, constantly meshing with the hi-drive gear 40, is also rotatably mounted on the counter shaft 50 being coaxially spaced from the lo-driven gear 48. Drive gears 54 and 56 are juxtaposed and rigidly secured to the speed counter shaft 50.

A speed output shaft, indicated in its entirety by the numeral 58, is rotatably supported by a pair of bearings 60 in the housing 28. The shaft 58 carries speed output driven gears 62, 64 and 66, as well as gear synchronizers 68 and 70 being only partially illustrated in the drawing.

A rearward end 72 of the shaft 58 is rigidly attached to a front wall 74 of a master clutch housing 76, thereby transmitting speed output shaft torque thereto. The master clutch 16 comprises a hydraulic piston 78 actuated by the force of the hydraulic fluid supplied thereto through a passage 80, which is connected with the vehicle hydraulic system. The piston 78 includes the piston plate 81 which squeezes separator plates 82 attached to the housing 76 and friction disks 84 alternatively interleaved between separator plates 82 for a conjoint rotation. The piston plate 81 squeezes a piston return spring 86 mounted on support pins 88 for frictional engagement of friction disks 84 and separator plates 82 in order to transfer torque from the speed output shaft 58 to the range transmission sections 14. The front wall 74 arrests the longitudinal displacement of the engaged friction disks and separator plates, 84 and 82, respectively. The friction disks 84 are carried by a clutch hub 90 via splines 92 in a tubular wall 94 in the clutch hub 90. The tubular wall 94 is perforated by a plurality of intake ports 96. The cooling flow is forced through the intake portes 94 for dissipating of heat generated by frictional engagements of the disks and separator plates. The hydraulic fluid from the vehicle hydraulic system enters the clutch housing 76 through the oil channel 97 for distributing the fluid through the intake ports 96. The tubular wall 94 is supported by a web 98 which contains equidistantly and periferally disposed apertures 100 facilitating an even distribution of the fluid to the intake ports 96. The web 98 has a unitary construction with a base collar 102 being internally splined at 104 to a range input shaft 106.

The range input shaft 106 rotatably supported by a pair of bearings 107 mounted in the range housing 108 being partially illustrated in FIG. 1. The shaft 106 is aligned with the speed output shaft 58 via a sleeve 109 threaded to the range input shaft 106. Forward drive gears 110, 112, and 114 are carried by the shaft 106 and provided hi, mid, and low ranges, respectively. A reverse drive gear 116 is rotatably mounted on the shaft 106 adjacent to gear 114. The partially shown mid-hi gear synchronizer 118 is mounted of the shaft 106 between gears 112 (mid range) and 110 (hi range). A lo gear synchronizer, indicated in its entirety by the numeral 120, operatively connectable with the shaft 106 and a range counter shaft 122. The shaft 122 extending through the range transmission 14 is journalled in the housing 108 by a pair of bearings 124. Hi-range, mid-range, and lo-range driven gears 126, 128 and 130, respectively, are mounted on the shaft 122. The driven gears 126, 128, and 130 are constantly meshing with the drive gears 110, 112, and 114.

A range output drive gear 134 rotatably mounted on a schematically shown range output shaft 136 is constantly meshing with the reverse gear 116 and the drive gear 132. The driven gear 134 is also constantly meshing and driving a front wheel drive gear 137 the fragment thereof being shown in FIG. 1.

A PTO and pump drive shaft 138 interfits edgewise with the input shaft 26 via its yoke portion 140 being journalled on the shaft 26. An input gear 142 rotatably supported by bearings 144 in the housing 108 has a support base 146 internally splined to the pump drive shaft 138 and a PTO intermediate shaft 148. The shaft 148, partially shown in FIG. 1, coaxially abuts the shaft 138 on its one side and on the other side is connected to a multi-membered PTO shaft leading to the PTO rear drive shaft (not shown in the drawing). Such a disposition of the PTO shaft facilitates power transmittal from the engine flywheel 22 to the PTO reduction gearing behind the transmission at an engine speed using smaller diameter shafting. The PTO intermediate shaft 148 is coaxially disposed and freely movable within the range counter shaft 122 which is essentially a quill shaft.

A pump counter shaft gear 150 is constantly meshing with and driven by the input gear 142. The gear 150 is carried by the pump counter shaft 152 connected with the pump housing 155 only portions of which are shown in the drawing. The gear 150 constantly meshes with a drive arbor gear 154 integral with the pump arbor 156, which is rotatably supported by a pair of bearings 158 in the housing 155.

As is evident from the above, the speed transmission 12 has six drive gear selections. The gears are closely spaced and have a speed change between 14% to 18%. Shifting between first and second (gear 66 is engaged), third and fourth (gear 64 is engaged), and fifth and sixth (gear 62 is engaged) are power shifts carried out by alternative engagement of the drive clutch packs 30 and 32. The speed power shifting is made while tractor is on the go and the master clutch 16 is engaged. Shifting between second and third, or fourth and fifth synchronized shift speeds, is carried out by a corresponding engagement of gear synchronizers 68 and 70, can be made without stopping the tractor.

In operation, the power shift between speeds 1-2, 3-4, and 5-6 is carried out by hydraulic actuation of either of drive clutch packs 30 or 32. When the lo-clutch pack 30 is actuated, the power is transmitted from the input shaft 26 through the clutch 36 to the gear 34, which in turn transfers it through the constantly meshing therewith gear 48 to the gears 52, 54, and 56 on the shaft 50. The gears 52, 54 and 56 constantly meshing with the transmitting power to the gears 62, 64, and 66 drive the speed output shaft 58. Alternatively, when the hi-drive clutch pack 32 is engaged, the power is transmitted from the input shaft 26 through the gear 40 to the shaft 50 and thereafter to the shaft 58 following the power path as described in lo-clutch engagement. The power shifting between hi and lo clutch packs 30 and 32 does not require the clutch 16 disengagement.

The gears 62, 64, and 66 are freely rotatable on the shaft 58. The engagement of the gear 66 for the tractor operation in first and second speeds is carried out by shifting the synchronizer 68 from its shown neutral position toward the gear 64, thereby coupling it with the shaft 58 for conjoint rotation. The same synchronizer 68 is utilized for engaging the gear 64 by shifting it towards the gear 66 and coupling it with the shaft 58. The synchronizer 70 is utilized only for the engagement of the gear 62 in order to operate a tractor in the sixth gear. The synchronized shift between the above-described speeds requires the master clutch 16 disengagement. But still this shift is made on the go, i.e. without stopping the tractor.

The speed output shaft 58 transmits power from the engine driven input shaft 26 to the range transmission 14 via a master clutch 16. When the master clutch 16 is engaged, the power output from the shaft 58 transmits through the range input shaft 106 to the gears 110, 112, 114, and 116 mounted thereon is carried out by alternative engagement of gear synchronizers 118 and 120. However, the reverse gear 116 is not engaged by synchronizers. It directly engages the range output gear 134 to rotate the output shaft 136. The gear 110 engagement by the synchronizer 118, coupling it with the shaft 106, thereby transmitting power from the gear 110 through the gears 126, 132, and 134, provides the high range output.

The same synchronizer 118 is utilized for engagement of mid-range speeds by coupling the shaft 106 to the gear 112. The gear 112 drives the driven gear 128 driving the gear 132 which subsequently drives the gear 134 on the shaft 136. The transmittal of the power from the range counter shaft 122 through the gears 132 and 134 to the range output shaft 136 applies to all forward gear paths 110, 112, and 114.

The low range gear 114 is engaged via the synchronizer 120 when it is shifted away from the gear, thereby coupling the gear 130 with the range counter shaft 122. The reverse gear 116 is a non-synchronized gear and directly engages the range output shaft gear 134 to drive the range output shaft 136 and eventually the tractor final drive.

The drive clutch packs 30 and 32 should be disengaged during all synchronizer shifting and are sequenced in such a way so as to re-engage before the master clutch 16 is engaged. Electronically controlled solenoid values are used to control the oil flow to each of the drive clutch packs. Pressures switches monitor the operation of each clutch pack. Pressure switch on the on coming clutch signals the off going clutch solenoid at a predetermined pressure. This gradual clutch-to-clutch flow distribution gives the continuous power flow and smooth shift through the transmission during the power shift cycle.

The range transmission section 12 has three synchronized forward gears (low, medium, and high) and one non-synchronized reverse gear. This makes a total of 18 forward and six reverse speeds. The three range ratios were selected to feature optimum ground speeds for PTO (lo), tillage (med), and transport (high).

The PTO (power take off) power is transmitted through the PTO shaft in-line sections of which are shown in the drawings. The transmission input shaft 26 drives the PTO and pump drive shaft 138, which in its turn, through the support base 146, transmits power to the PTO intermediate shaft 148 and subsequently to the PTO rear drive shaft which is not shown in the drawing. Power is transmitted from the engine into the PTO reduction gear at the engine speed in order to reduce the diameter of linking power transmitting shafts.

All synchronizer shifting of the speeds in the speed section and in the range section require simultaneous disengagement of the master clutch and the drive clutch packs by depressing the clutch pedal at an operator's station. The master location between the speed and range sections, as well as power shift clutches location on the speed input shaft, facilitate reduction of energy, time and shift force for synchronizer shifting, particularly when all clutches are simultaneously disengaged. Disengaging the power shift clutches 30 and 32 lowers the inertia for synchronizer shifting of the speed transmission. With the master clutch disengaged, the inertia is lowered for both the range and speed transmission synchronizer shifting. When the clutch pedal is released, one of the synchronizers engaging the required speeds, the shift clutch of the drive clutch packs is engaged first and thereafter the master clutch 16 is engaged to pick up the load.

The power shifting between the clutches 36 and 42 of the hi and lo clutch packs 30 and 32 does not require any clutching. All synchronizer shifting and power shifting between the clutch packs is done on the go, i.e. without stopping the motor vehicle.

The foregoing description and drawings merely illustrates the preferred embodiment and the invention is not limited thereto, except insofar as that the appended claims are so limited, and so those skilled in the art who had the disclosure before them will be able to make the modifications and variations therein without departing from the scope of the invention.

What is claimed is:

1. A motor vehicle transmission comprising:
a speed transmission section connected with the vehicle engine and comprising:
an engine driven input shaft means extending through said speed section;
drive clutch packs mounted on said input shaft means and hydraulically actuated in the alternative manner;
a plurality of gears mounted on a speed output shaft and selectively engageable by gear synchronizers secured to said output shaft;
said gears being driven by drive gears mounted on an intermediate counter shaft and, in its turn, driven by either of said clutch packs;
a range transmission section being in a tandem arrangement with said speed transmission section and coupleable therewith through a hydraulically actuated master clutch transmitting power from said speed transmission section to said range section;
said range section comprising a plurality of synchronized forward gears and a non-synchronizer reverse gear providing at least three speed ranges;
said input shaft means passing through said range section and by-passing said master clutch;
whereby during all synchronized shifting said master clutch and said clutch packs are disengaged, and re-engagement of said master clutch follows that of said clutch packs.

2. The invention according to claim 1, and
said forward and reverse gears mounted on a range input shaft connected with said master clutch;
said range transmission section including a counter shaft and range output shaft operatively connected with and driven by said range input shaft.

3. The invention according to claim 1, and
said range section transmitting power through a single range output drive gear.

4. A motor vehicle transmission comprising:
a speed transmission section comprising:
an engine driven input shaft extending through said speed section;
a speed counter shaft and speed output shaft disposed parallel to said input shaft being extended through the speed transmission section and supported by a housing thereof;
a set of speed drive gears mounted on said speed counter shaft and constantly meshing with another set of gears mounted on said speed output shaft and driven by said drive gears;
at least a pair of drive clutch packs mounted on said input shaft for power shifting of said speed output shaft gears;
each of said drive clutch packs including a drive gear constantly meshing with a corresponding driven gear mounted on said speed counter shaft;
said drive clutch packs alternatively and hydraulically engaging said corresponding driven gears to transmit power from said input shaft to said speed counter shaft;
gear synchronizers secured to said speed output shaft and engaging gears mounted on said shaft;
a range transmission section sequentially connected with said speed transmission section through a master clutch disposed therebetween;
said range transmission section comprising a range input shaft, a range counter shaft, and a transmission output shaft operatively connected therewith;
a set of forward gears mounted on a range input shaft and engageable by gear synchronizers operatively connected with said shaft;
a reverse non-synchronized gear mounted on said range input shaft;
said master clutch transmitting power to said range input shaft;
said input shaft coaxially secured to a power transfer shaft means passing through said range counter shaft and by-passing said master clutch;
whereby engagement and disengagement of gears by synchronizers requires the master clutch disengagement, while power shifts by virtue of said clutch packs require the clutch engagement.

5. The invention according to claim 4, and
said power transfer shaft means comprising gear means for driving gears secured to a pump.

6. The invention according to claim 4, and
said transmission output shaft comprising a range output drive gear transmitting power from said reverse and all said range forward gears.

7. The invention according to claim 6, and
said transmission output drive gear constantly meshing with said reverse gear.

8. The invention according to claim 5, and
shaft gear means comprising a gear mounted on a pump counter shaft.

9. The invention according to claim 4, and
said set of speed drive gears including three gears being engageable by said gear synchronizers and drive clutch packs to provide at least six speeds.

10. The invention according to claim 4, and
said set of forward gears comprising three gears providing three speed ranges;
said reverse gear providing six reverse speeds.

11. The invention according to claim 4, and
said reverse gear being placed at an end of said range input shaft.

* * * * *